United States Patent
Wirtanen et al.

(10) Patent No.: US 10,397,756 B1
(45) Date of Patent: Aug. 27, 2019

(54) SMS INDICATION APPLICATION RESPONSE REPORTING

(71) Applicant: FORD GLOBAL TECHNOLOGIES, LLC, Dearborn, MI (US)

(72) Inventors: Jeffrey William Wirtanen, Kanata (CA); Shu-Lin Chen, Kanata (CA)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/944,941

(22) Filed: Apr. 4, 2018

(51) Int. Cl.
*H04W 4/00* (2018.01)
*H04W 4/14* (2009.01)
*H04L 29/06* (2006.01)
*H04L 12/24* (2006.01)
*H04W 4/40* (2018.01)
*H04W 84/04* (2009.01)
*H04W 84/00* (2009.01)

(52) U.S. Cl.
CPC .......... *H04W 4/14* (2013.01); *H04L 41/0677* (2013.01); *H04L 69/18* (2013.01); *H04W 4/40* (2018.02); *H04W 84/005* (2013.01); *H04W 84/042* (2013.01)

(58) Field of Classification Search
CPC ...... H03M 13/09; H04L 1/004; H04L 1/0061; H04L 1/0072; H04L 51/10; H04L 69/329; H04M 3/42382; H04W 80/00; H04W 88/184
See application file for complete search history.

(56) References Cited

U.S. PATENT DOCUMENTS

| | | | |
|---|---|---|---|
| 9,191,252 B1* | 11/2015 | Zarubica | H04L 27/0014 |
| 2003/0193967 A1* | 10/2003 | Fenton | H04L 29/06 370/490 |
| 2006/0215600 A1* | 9/2006 | Chen | H04W 88/08 370/328 |
| 2015/0207679 A1* | 7/2015 | Maeng | H04L 12/12 710/106 |
| 2015/0264017 A1 | 9/2015 | Saed et al. | |
| 2017/0063994 A1* | 3/2017 | Lei | H04L 67/12 |
| 2017/0108858 A1 | 4/2017 | Feng | |

OTHER PUBLICATIONS

3GPP TS 23.040 V14.0.0 (Mar. 2017): 3rd Generation Partnership Project; Technical Specification Group Core Network and Terminals; Technical realization of the Short Message Service (SMS) (Release 14), hereinafter TS23.040 (Year: 2017).*
Thomas, Dallas, "Messages 101: How to Turn iMessage Read Receipts On/Off Per Person," Jul. 27, 2017; retrieved from https://ios.gadgethacks.com/how-to/messages-101-turn-imessage-read-receipts-on-off-per-person-0171792/ on Oct. 9, 2017.

* cited by examiner

*Primary Examiner* — Ronald Eisner
(74) *Attorney, Agent, or Firm* — Michael J. Spenner; Brooks Kushman P.C.

(57) ABSTRACT

A telematics controller is programmed to successfully receive a short message service (SMS) message from a service data network via a modem, identify an application layer error condition or other application level result code at the vehicle, and responsive to receipt of the SMS message, include information indicative of the application layer error condition or other application level result code in an SMS deliver report to send to the service data network.

20 Claims, 2 Drawing Sheets

US 10,397,756 B1

SMS INDICATION APPLICATION RESPONSE REPORTING

TECHNICAL FIELD

Aspects of the disclosure relate to use of short message service (SMS) deliver reports messaging to indicate application level errors or other application level result codes.

BACKGROUND

GSM (Global System for Mobile Communications, originally Groupe Spécial Mobile) is a standard developed by the European Telecommunications Standards Institute (ETSI) to describe the protocols for second-generation digital cellular networks used by mobile devices. A new feature of GSM was the SMS text messaging service. Since its introduction, use of SMS messaging has grown such that billions of SMS messages are sent monthly.

SUMMARY

In one or more illustrative examples, a system includes a modem of a vehicle and a telematics controller of the vehicle. The telematics controller is programmed to successfully receive a short message service (SMS) message from a service data network via the modem, identify an application layer error condition or other application level result code at the vehicle at the vehicle, and responsive to receipt of the SMS message, include information indicative of the application layer error condition in an SMS deliver report to send to the service data network.

In one or more illustrative examples, a method includes, responsive to receipt by a vehicle of a short message service (SMS) message from a service data network via the modem, sending an SMS deliver report to the service data network including information indicative of an application layer error condition or other application level result code identified by the vehicle.

In one or more illustrative examples, a non-transitory computer-readable medium comprising instructions that, when executed by a processor of a telematics control unit of a vehicle, cause the telematics control unit to receive a short message service (SMS) message from a service data network via a modem, identify an application layer error condition or other application level result code at the vehicle, and responsive to receipt of the SMS message, include information indicative of the application layer error condition in an SMS deliver report to send to the service data network.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle communication system may utilize SMS to send small amounts of information to a vehicle to wake the vehicle to connect to a cloud server to retrieve commands or configuration changes. If there is an error or a failure occurs in the handling of the SMS or in the payload sent to the vehicle at the application layer, there is no mechanism in the SMS protocol to indicate that an error occurred. As some examples, the error could be an encryption decode failure, the vehicle not being in a state to place a data call, or the vehicle being in an area of poor coverage. Or, result codes, resource availability, or other information may be available at the application layer that may be useful to the sender of the SMS. Moreover, there is no specific method to indicate an application layer processing error has occurred and the type of error without either sending an additional SMS or data call, which wastes battery life—especially in poor coverage areas. This may lead to additional unnecessary retries and ignored commands. In a specific case, a telematics control unit (TCU) of a vehicle may not "wake up" and thus be unable to connect to a service data network to retrieve a command (i.e., unlock the vehicle doors).

Figure 1:
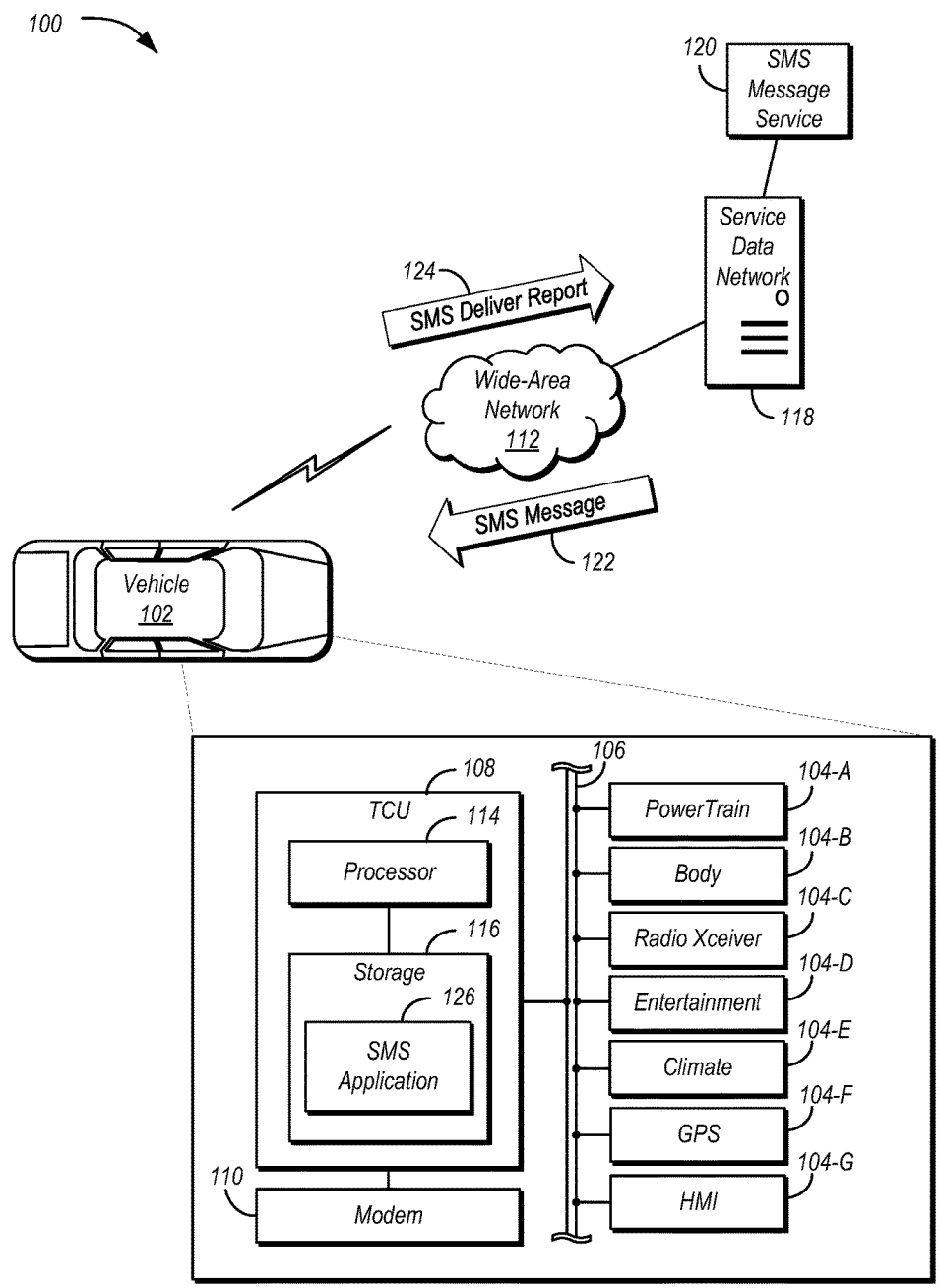
FIG. 1 illustrates an example system implementing SMS messaging to vehicles.

FIG. 1 illustrates an example system 100 implementing SMS messaging to vehicles 102. As illustrated, a vehicle 102 includes a plurality of vehicle controllers 104 in communication over one or more vehicle buses 106. The system 100 also includes a service data network 118 configured to provide an SMS message service 120 to send SMS messages 122 to the various vehicles 102 over a wide-area network 112. The vehicle 102 further includes a telematics control unit (TCU) 108 configured to use a modem 110 to receive SMS messages 122 from the SMS message service 120 and, in response, to provide SMS deliver reports 124 back to the SMS message service 120. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104, sometimes referred to as electronic control units (ECUs), configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle ECUs 104, as well as between the TCU 108 and the vehicle ECUs 104. As some non-limiting examples, the vehicle bus 106 may include one or more of a vehicle controller area network (CAN), an Ethernet network, and a media oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, a wide-area network, and a telephone network, as some non-limiting examples. As another example, the TCU 108 may utilize one or more of BLUETOOTH, Wi-Fi, or wired USB connectivity to facilitate communication with the wide-area network 112 via a network connection of the user's mobile device (now shown).

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, a processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The service data network 118 may include various types of computing apparatus, such as a computer workstation, a server, a desktop computer, a virtual server instance executed by a mainframe server, or some other computing system and/or device. Similar to the TCU 108, the service data network 118 generally includes one or more memories on which computer-executable instructions may be maintained, where the instructions may be executable by one or more processors (not shown for clarity). Such instructions and other data may be stored using a variety of computer-readable media.

An SMS message service 120 may be one application included on the storage of the service data network 118. The SMS message service 120 may include instructions that, when executed by the processor of the service data network 118, cause the service data network 118 to send SMS messages 122 to the vehicles 102 to cause the vehicles 102 to perform various operations. As some examples, the SMS message service 120 may be directed to send an SMS message 122 to a vehicle 102 to unlock the doors of the vehicle 102, to start the engine of the vehicle 102, to provide a destination address to the vehicle 102 for navigation, or to request diagnostic information from the vehicle 102.

An SMS application 126 may be an application included on the storage 116 of the TCU 108. The SMS application 126 may include instructions that, when executed by the processor 114 of the TCU 108, cause the TCU 108 to receive the SMS messages 122 from the service data network 118, and perform the function requested by the received SMS messages 122. Performing the function may involve sending one or more commands to the ECUs 104 via the vehicle bus 106. For instance, to implement a door unlock command, the SMS application 126 may direct the TCU 108 to send a command to instruct the body controller 104-B to unlock the doors. As another example, to implement a remote start command, the SMS application 126 may direct the TCU 108 to send a command to instruct the powertrain controller 104-A to engage the engine.

The SMS application 126 may be further configured to, in response to receipt of an SMS message 122, provide an SMS deliver report 124 to be delivered back to the service data network 118. To explain, when the TCU 108 receives the SMS message 122 via the modem 110, the TCU 108 processes the SMS message 122 and provides information about the delivery either by a successful SMS deliver report 124 or a failure SMS deliver report 124. To accomplish this, the SMS protocol is a layered protocol whereby the SMS-TP (Short Message Transfer Layer Protocol) provides the end-to-end delivery, while the SMS TP-PDUs and the SMS-RP (Short Message Relay Layer Protocol) is a lower layer peer-to-peer protocol that relays the SMS TP-PDUs from node to node to the final destination. Notably, errors may occur during the relay of the SMS message 122 to the destination (RP Layer), at the destination (TP Layer) and at the destination SMS application 126.

For every request to deliver an SMS message 122 (e.g., a SMS-DELIVER request) sent by the originator, there is a corresponding SMS deliver report 124 (e.g., an SMS DELIVER REPORT TP-PDU) received indicating a positive or a negative acknowledgement of the SMS delivery to its destination. In other words, a SMS deliver report 124 (TP Layer) relayed via a RP-ERROR or RP-ACK PDU (RP Layer) indicates a negative or positive delivery and processing to the originator. Further aspects of the sending of SMS messages 122 and receipt of SMS deliver reports 124 are described in detail in the Global System for Mobile communication (GSM) 03.40 or 3rd Generation Partnership Project (3GPP) Technical Specification (TS) 23.040 standard, which are incorporated herein by reference in their entireties.

Notably, if the delivery of the SMS message 122 is successful to the destination but there is a failure of application layer processing (or additional information available), there is no mechanism in SMS to indicate the failure (or additional information). Instead, SMS supports only the indication that a failure has occurred because of the RP or TP Layer. As some examples, the error may be an encryption decode failure, the vehicle 102 not being in a state to place a data call, or the vehicle 102 being in an area of poor coverage. Or, result codes, resource availability, or other information may be available at the application layer that may be useful to the sender of the SMS. Moreover, there is no specific method to indicate an application layer processing error has occurred and the type of error without either sending an additional SMS message 122 or data call, which wastes battery life—especially in poor coverage areas. This may lead to additional unnecessary retries and ignored commands. In a specific case, the TCU 108 may not "wake up" and thus be unable to connect to the service data network 118 to retrieve an SMS message 122 command (e.g., to unlock the vehicle 102 doors).

Several mechanisms may be utilized by which application layer processing errors may be reported via the SMS deliver report 124. As one example, the RP-ERROR mechanism may be enhanced to provide details of application-specific TP errors. To explain, an RP-ERROR message must be sent to indicate a SMS deliver report 124 for RP ERROR types that includes an application-specific TP Failure cause with a "E0-FE Values specific to an application." Further information on application-specific TP Failure causes may be identified in 3GPP standards document TS 23.040, section 9.2.3.22, which is incorporated herein by reference in its entirety. Currently there is no RP-ERROR cause code to indicate a TP-ERROR, as may be identified in Table 8.4 of 3GPP TS standards document 24.011, which is incorporated herein by reference in its entirety. To address this, a new RP-ERROR cause such as Cause No. 103 "Short Message Transport Protocol Failure" that indicates a TP-Failure-Cause (TP-FCS) may be included in the SMS deliver report 124 for RP ERROR type TP-PDU. Additionally, TP Failure causes may also be added to the SMS deliver report 124 to further indicate specific failures in addition to the "E0-FE Values specific to an application" as specified by the 3GPP standard.

As another example, a custom RP-ERROR cause code by itself without an TP-FCS may be added to indicate an application-specific failure.

As yet a further example, manufacturer-specific TP User Data may be further included (i.e., piggy-backed) into the SMS deliver report 124 for RP ERROR type of failure/issue. The SMS deliver report 124 may optionally include TP User Data, as discussed in 3GPP standards document 23.040, section 9.2.2.1a, which is incorporated herein by reference in its entirety. The TP User Data may be provided in various formats (e.g., a simple cause code, encrypted data, or a new protocol itself). If TP User Data is included in the SMS deliver report 124, the service data network 118 may check to decode the application response (e.g., no data connection possible).

As an even further example, manufacturer-specific TP User Data may be included (e.g., piggy-backed) into the SMS deliver report 124 for RP ACK type to indicate the SMS message 122 was successfully delivered but there was an error in processing at the application level. The SMS deliver report 124 may optionally include TP User Data. The TP User Data may be provided in various formats (e.g., a simple cause code, encrypted data, or a new protocol itself). If TP User Data is included in the SMS deliver report 124, the service data network 118 may check to decode the application response (e.g., no data connection possible).

Figure 2:
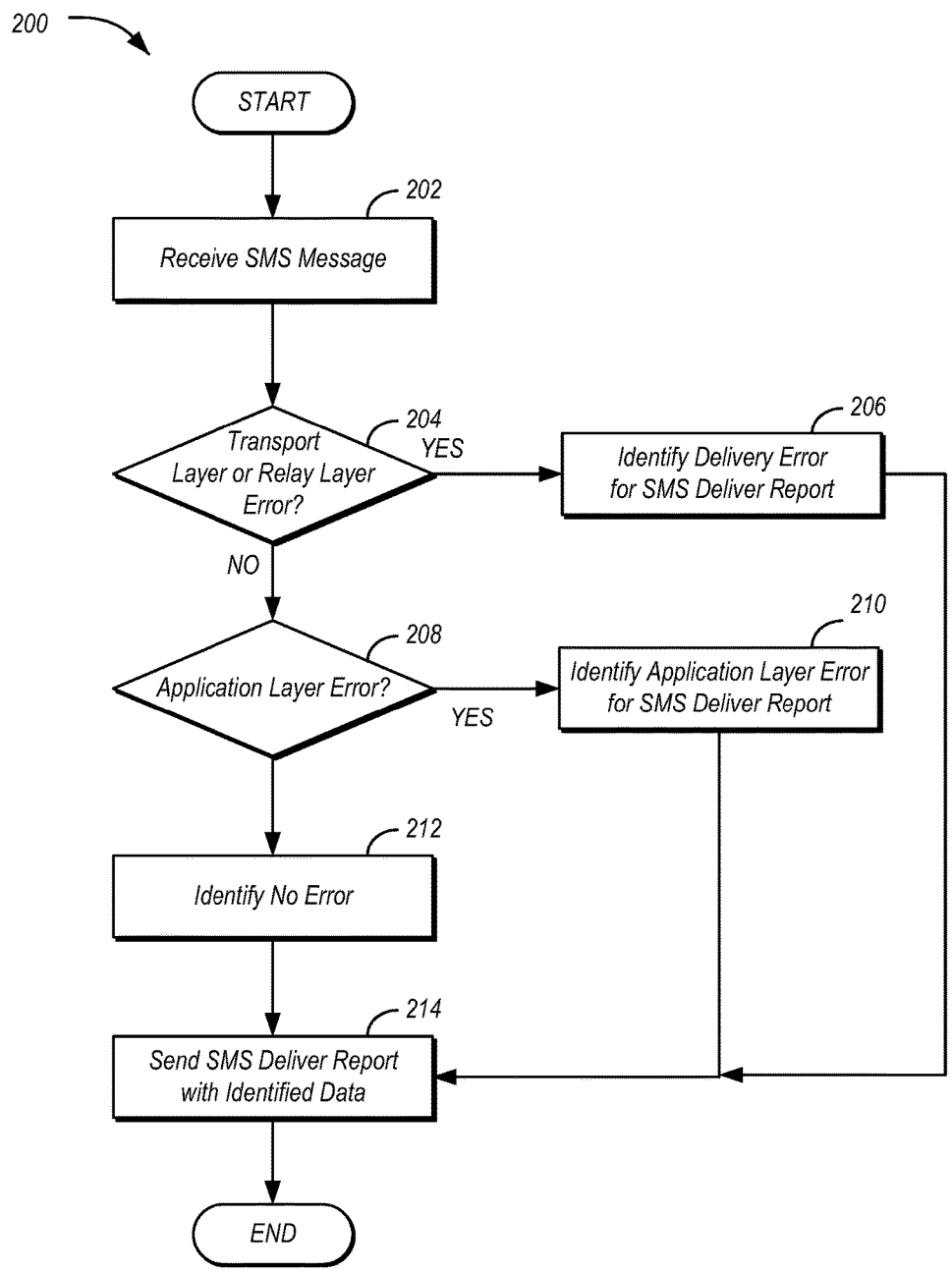
FIG. 2 illustrates an example process for using SMS deliver report to indicate application level errors.

FIG. 2 illustrates an example process 200 for using SMS deliver report 124 to indicate application level errors. In an example, the process 200 may be performed by the TCU 108 of the vehicle 102 in communication over the wide-area network 112 with the service data network 118.

The TCU 108 receives an SMS message 122 at 202. At 204, the TCU 108 determines whether a transport layer or relay layer error condition occurred. As some examples, these errors may include conditions such as lack of sufficient memory to receive the SMS message 122, required data missing in the SMS message 122, an unexpected data value in the SMS message 122 that is formally correct but unexpected in the current context, an indication that the recipient does not support SMS messages 122 or other rejection of the SMS message 122 by the recipient. If a transport layer or relay layer error condition occurred, control passes to operation 206 to indicate the delivery error be included in an SMS deliver report 124 for the received SMS message 122. After operation 206, control passes to operation 214. If no transport or relay error occurred at 204, control passes to operation 208.

At operation 208, the TCU 108 determines whether an application layer error condition occurred. As compared to the transport or relay errors discussed regarding operation 204, the application layer errors are error conditions in which a failure of application layer processing occurred for an otherwise successful delivery of the SMS message 122. As some examples, these application layer errors may include an encryption decode failure occurring when the TCU 108 attempts to decrypt the received SMS message 122, the TCU 108 not being in a state in which the TCU 108 is able to place a data call, or the vehicle 102 being in an area of poor coverage. If an application layer error condition occurred, control passes to operation 210. Otherwise, control passes to operation 212 to identify no error condition to be included in the SMS deliver report 124. After operation 212, control passes to operation 214.

At 210, the TCU 108 identifies an application layer error condition to be included in an SMS deliver report 124 for the received SMS message 122. This may be accomplished in various ways. As one example, the RP-ERROR mechanism may be enhanced to provide details of application-specific TP errors. As another example, a custom RP-ERROR cause code without TP-FCS may be added to indicate an application-specific failure. As yet a further example, manufacturer-specific TP User Data may be further included into the SMS deliver report 124 for RP ERROR type of failure/issue. As an even further example, manufacturer-specific TP User Data may be included into the SMS deliver report 124 for RP ACK type to indicate the SMS message 122 was successfully delivered but there was an error in processing at the application level. After operation 210, control passes to operation 214.

The TCU 108 sends the SMS deliver report 124 including the identified data at operation 214. Thus, the described systems and methods allow the system 100 to indicate SMS message 122 processing failures (or other additional information available at the application level) at the vehicle 102 using the error reporting facilities of the SMS message 122 protocol itself. In doing so, an SMS message 122 that cannot be processed at the application layer may be discarded. This can avoid issues such as battery drain in attempted data calls when the vehicle 102 is in an area of poor data coverage. Without this additional information in the SMS deliver report 124, the service data network 118 may attempt one or more retries to reach the vehicle 102 where the SMS message 122 continues to fail encryption decoding or the vehicle 102 may still be in a state where the vehicle 102 does not have data service to connect to the service data network 118 to retrieve SMS message 122 commands. Additionally, the vehicle 102 or TCU 108 may be in a poor coverage area in which the transfer of data for tasks such as software upgrades/downloads are extremely battery intensive and should be delayed. This ability to provide an application layer cause code or reason within the initial SMS message 122 procedure accordingly provides a major advantage. Additionally, if the TCU 108 is in a state where data service is not possible, the failure reason may include information to help solve this issue. After operation 214, the process 200 ends.

Computing devices described herein, such as the TCU 108 and service data network 118, generally include computer-executable instructions where the instructions may be executable by one or more computing devices such as those listed above. Computer-executable instructions, such as those of the SMS message service 120 or the SMS application 126, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a modem of a vehicle; and
a telematics controller of the vehicle configured to communicate using a first protocol requiring a first level of resource usage and a second protocol requiring a second level of resource usage greater than the first level, programmed to
successfully receive a short message service (SMS) message from a service data network via the modem,
identify an application layer error condition that includes the telematics controller being in an area of network coverage requiring use of the second protocol or other application level result code, the application level result code being generated at the vehicle, and
responsive to receipt of the SMS message, include information indicative of the application layer error condition in an SMS deliver report to send to the service data network.

2. The system of claim 1, wherein the application layer error condition is included in the SMS deliver receipt using an RP-ERROR mechanism enhanced to provide details of application-specific errors.

3. The system of claim 1, wherein the application layer error condition is included in the SMS deliver receipt using a custom RP-ERROR cause code configured to indicate an application-specific failure.

4. The system of claim 1, wherein the application layer error condition is included in the SMS deliver receipt using manufacturer-specific transport protocol (TP) user data.

5. The system of claim 1, wherein the application layer error condition is included in the SMS deliver receipt as an RP ACK type configured to indicate the SMS message was successfully delivered but there was an error in processing at the application layer.

6. The system of claim 1, wherein the application layer error condition includes an encryption decode failure of the SMS message by the telematics controller.

7. The system of claim 1, wherein the application layer error condition includes the telematics controller being in a state during which data call functionality is unavailable.

8. The system of claim 1, wherein the resource usage includes one or more of power draw or network coverage.

9. A method comprising:
    receiving, by a modem of a vehicle, a short message service (SMS) message from a service data network via a modem of a vehicle, wherein communicating using a first protocol requires a first level of resource usage and communicating using a second protocol requires a second level of resource usage greater than the first level;
    identifying, by telematics controller of the vehicle, an application layer error condition indicating the vehicle as being in an area of network coverage requiring use of the second protocol or other application level result code, the application level result code being generated at the vehicle; and
    responsive to receipt by the modem of the vehicle of a short message service (SMS) message from a service data network, sending via the modem an SMS deliver report to the service data network including information indicative of an application layer error condition or other application level result code, the other application level result code being identified by the telematics controller of the vehicle.

10. The method of claim 9, further comprising including the application layer error condition in the SMS deliver receipt using an RP-ERROR mechanism enhanced to provide details of application-specific errors.

11. The method of claim 9, further comprising including the application layer error condition in the SMS deliver receipt using a custom RP-ERROR cause code configured to indicate an application-specific failure.

12. The method of claim 9, further comprising including the application layer error condition in the SMS deliver receipt using manufacturer-specific transport protocol (TP) user data.

13. The method of claim 9, further comprising including the application layer error condition in the SMS deliver receipt as an RP ACK type indicating the SMS message was successfully delivered but there was an error in processing at the application layer.

14. The method of claim 9, further comprising identifying the application layer error condition responsive to failing to decode encryption of the SMS message.

15. The method of claim 9, wherein the application layer error condition includes being in a state during which data call functionality is unavailable.

16. The method of claim 9, wherein the resource usage includes one or more of power draw or network coverage.

17. A non-transitory computer-readable medium comprising instructions that, when executed by a processor of a telematics control unit of a vehicle, cause the telematics control unit to:
    receive a short message service (SMS) message from a service data network via a modem, wherein communicating using a first protocol requires a first level of resource usage and communicating using a second protocol requires a second level of resource usage greater than the first level,
    identify an application layer error condition that indicates the vehicle as being in an area of network coverage requiring use of the second protocol or other application level result code, the application level result code being generated at the vehicle, and
    responsive to receipt of the SMS message, include information indicative of the application layer error condition in an SMS deliver report to send to the service data network.

18. The medium of claim 17, further comprising instructions that, when executed by the processor, cause the telematics control unit to at least one of:
    include the application layer error condition in the SMS deliver receipt using an RP-ERROR mechanism enhanced to provide details of application-specific errors;
    include the application layer error condition in the SMS deliver receipt using a custom RP-ERROR cause code configured to indicate an application-specific failure;
    include the application layer error condition in the SMS deliver receipt using manufacturer-specific transport protocol (TP) user data; or
    include the application layer error condition in the SMS deliver receipt as an RP ACK type indicating the SMS message was successfully delivered but there was an error in processing at the application layer.

19. The medium of claim 17, wherein the application layer error condition includes being in a state during which data call functionality is unavailable.

20. The medium of claim 17, wherein the resource usage includes one or more of power draw or network coverage.

* * * * *